United States Patent

Iwamoto et al.

[11] Patent Number: 5,994,805
[45] Date of Patent: Nov. 30, 1999

[54] STARTER

[75] Inventors: Atsuya Iwamoto; Shigeru Shiroyama, both of Tokyo, Japan

[73] Assignee: Mitsubishi Denki Kabushiki Kaisha, Tokyo, Japan

[21] Appl. No.: 09/253,733

[22] Filed: Feb. 22, 1999

[30] Foreign Application Priority Data

Sep. 10, 1998 [JP] Japan .................................. 10-256820

[51] Int. Cl.⁶ .................................................. H02K 11/00
[52] U.S. Cl. .......................................... 310/68 C; 310/89
[58] Field of Search .................................. 310/68 C, 89, 310/90, 248

[56] References Cited

U.S. PATENT DOCUMENTS

| | | | |
|---|---|---|---|
| 4,389,692 | 6/1983 | Sander et al. | 310/68 C |
| 4,890,025 | 12/1989 | Hadeler et al. | 310/68 C |
| 5,770,901 | 6/1998 | Niimi et al. | 310/68 C |

FOREIGN PATENT DOCUMENTS 51-114541 9/1976 Japan .
56-37441 4/1981 Japan .

*Primary Examiner*—Nestor Ramirez
*Assistant Examiner*—Saeed Ghahramani
*Attorney, Agent, or Firm*—Sughrue, Mion, Zinn, Macpeak & Seas, PLLC

[57] ABSTRACT

A starter comprises a thermostat for detecting increases in the temperature of the starter and interrupting the energizing of the starter, the thermostat being disposed in the vicinity of brushes and secured to a rear bracket. A holder for restricting relative displacement between the rear bracket and the thermostat and a connector electrically connected to the thermostat having an O-ring on the outer circumference thereof may also be provided. The thermostat and the connector may be integrated or disposed independently and connected by lead wires. The thermostat may be disposed on the perimeter of the brushes with its longitudinal direction parallel to the axial direction of an armature or between the brushes and the rear bracket with its longitudinal direction perpendicular to the axial direction of the armature.

20 Claims, 4 Drawing Sheets

STARTER

BACKGROUND OF THE INVENTION

1. Field of the Invention

The present invention relates to a starter comprising a thermostat.

2. Description of the Related Art

A starter is activated by the action of switching on a start switch of a key switch, whereby an engine is ignited and started. Once the engine is ignited and started, the starter is deactivated by the action of switching off the start switch of the key switch. At that time, for reasons such as deterioration of the return of the key switch, etc., the start switch may not be switched off and the starter may continue to operate even after the engine has been ignited, whereby the starter generates heat and is damaged by that heat.

A known example of a conventional starter which provides the function of preventing the excessive continuous energizing of the starter, is the starter disclosed in Japanese Utility Model Laid-Open No. SHO 51-114541. In that starter, a relay contact is connected in series to an attracting coil of a starter magnetic switch and a positive resistor (posistor) is connected in series to a relay coil which opens and closes the relay contact, whereby any abnormal increase in the temperature of the attracting coil is detected and continuous energizing of the attracting coil in the starter is interrupted.

In Japanese Utility Model Laid-Open No. SHO 56-37441, a starter is proposed in which a bimetallic switch, which opens when a predetermined temperature is reached, and a resistance are connected to the coil of a magnetic switch in a starter.

One problem is that building switching devices, such as posistors, bimetallic switches, etc., into a starter which open or close a circuit when a predetermined temperature is reached, requires the procurement of space for installation, which is not easy and increases the size of the starter. Another problem is that unless a device is installed in a position where it can easily detect any increase in temperature which will damage the starter, the temperature detection performance thereof will be reduced.

SUMMARY OF THE INVENTION

The present invention aims to solve the above problems and an object of the present invention is to provide a starter comprising a fitted construction for a thermostat wherein a thermostat is disposed in the vicinity of brushes where it is easy to detect increases in temperature due to heat generated by a motor portion of the starter, especially heat generated by contact between commutator segments and the brushes, etc., and for which only a small installation space is required.

The starter according to the present invention comprises:

brushes disposed in positions facing a commutator disposed around the circumference of an armature;

a rear bracket for supporting the brushes; and a thermostat for detecting increases in the temperature of the starter and interrupting the energizing of the starter, the thermostat being disposed in the vicinity of the brushes and secured to the rear bracket.

The starter according to the present invention is also characterized in that it may also comprise a holder for restricting relative displacement between the rear bracket and the thermostat.

The starter according to the present invention is also characterized in that it may also comprise a connector electrically connected to the thermostat having an O-ring on the outer circumference thereof.

The starter according to the present invention is also characterized in that the thermostat and the connector may be formed integrally.

The starter according to the present invention is also characterized in that the thermostat and the connector may be disposed independently, the thermostat and the connector being connected by lead wires.

The starter according to the present invention is also characterized in that the thermostat may be rod-shaped, the longitudinal direction thereof may be parallel to the axial direction of the armature, and the thermostat may be disposed on the perimeter of the brushes.

The starter according to the present invention is also characterized in that the thermostat may be rod-shaped, the longitudinal direction thereof may be perpendicular to the axial direction of the armature, and the thermostat may be disposed between the brushes and the rear bracket.

The starter according to the present invention is also characterized in that a housing portion for housing the thermostat may be formed integrally with the rear bracket.

DETAILED DESCRIPTION OF THE PREFERRED EMBODIMENTS

Embodiment 1

Figure 1:
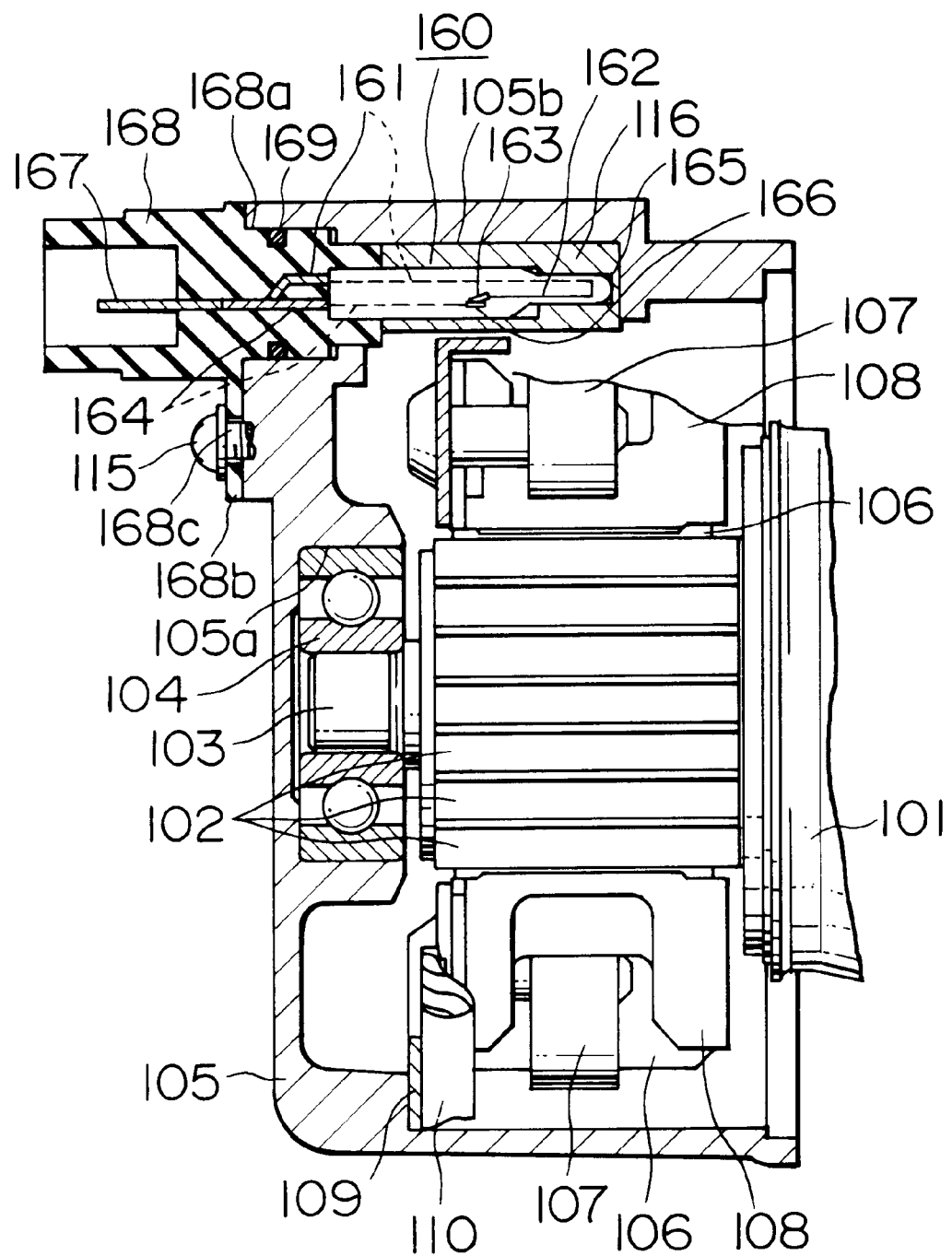
FIG. 1 is a cross-section of a fitted construction of a thermostat of a starter according to Embodiment 1 of the present invention.
Figure 2:
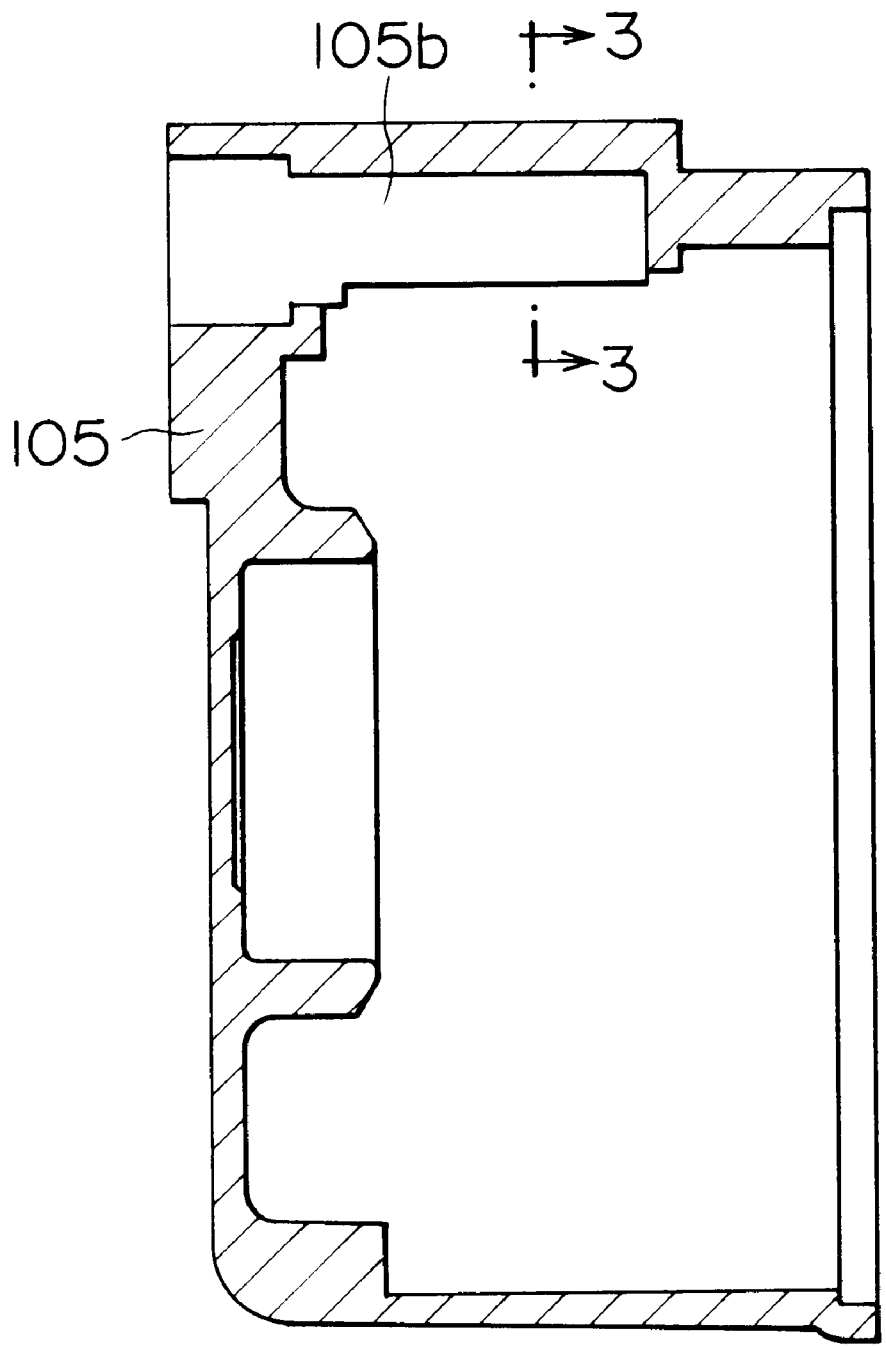
FIG. 2 is a cross-section of the rear bracket of the starter according to Embodiment 1 of the present invention.
Figure 3:
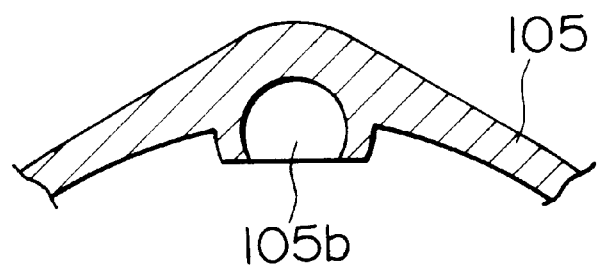
FIG. 3 is a cross-section taken along line 3—3 in FIG. 2.

FIG. 1 is a cross-section of a fitted construction of a thermostat of a starter according to an embodiment of the present invention, FIG. 2 is a cross-section of the rear bracket of the starter, and FIG. 3 is a cross-section taken along line 3—3 in FIG. 2.

In the figures, the shaft 103 of an armature 101 comprising commutator segments 102 arranged around the circumference thereof and constituting a motor portion is supported by a bearing 104 so as to be able to rotate freely. The bearing 104 is inserted into and supported by a recess portion 105a disposed in a thin-walled rear bracket 105 which houses the armature 101.

Brushes 106 which contact the commutator segments 102 and, together with the commutator segments 102, constitute contacts for supplying electric current to the armature 101 are disposed in positions facing the commutator segments 102. Lead wires 110 are connected to the brushes 106. The brushes 106 are pressed against the commutator segments 102 with a predetermined pressure by springs 107 and are supported by brush holders 108. The brush holders 108 are disposed at four positions equidistantly spaced around the circumference of the armature 101 and are secured to a brush holder base 109 by rivets (not shown). A female thread is disposed in the brush holder base 109, and the brush holder base 109 and the rear bracket 105 are secured to each other by inserting a male bolt from the outer end surface of the rear bracket 105 into a bore (not shown) disposed in the end of the rear bracket 105 so that the male bolt engages the female thread disposed in the brush holder base 109. In this way, the brush holder 108 is supported by the rear bracket 105.

A long, slender rod-shaped thermostat 160 for detecting increases in the temperature of the motor portion of the starter and interrupting the energizing of the starter is disposed in the vicinity of the brushes 106 radially outside the brushes 106 relative to the armature 101 such that the longitudinal direction of the thermostat 160 is parallel to the axial direction of the armature 101.

Within the thermostat 160 which comprises a hollow pipe-shaped steel terminal 165 having a closed end, a tip of a lead wire 161 which is one of two lead wires indicated by broken lines in the figure is connected to one end of a bimetallic element 162, and a contact 163 is disposed on the other end of the bimetallic element 162. Another contact 166 is disposed on a tip of the other lead wire 164. The bimetallic element 162 deforms such that above a predetermined temperature the contacts 163, 166 are open and on or below the predetermined temperature the contacts 163, 166 are closed.

The two lead wires 161, 164 lead from the steel terminal 165 to the outside, extending so as to be insulated from each other, and a male terminal 167 is connected to the tip of each of the lead wires 161, 164. A connector 168 is integrally formed by molding resin such that the two lead wires 161, 164 are covered.

An O-ring 169 is disposed on the cylindrical outer circumferential portion 168a of the connector 168. A flat plate-shaped flange 168b extends from the vicinity of the center of the connector 168. The connector 168 which is integrated with the thermostat 160 is secured to the rear bracket 105 by inserting a screw 115 into a bore 168c disposed in the flange 168b and engaging a female thread 105a disposed in the rear bracket 105.

A hollow cylindrical resin holder 116 having a closed end fits over the steel terminal 165 of the thermostat 160 and is disposed on an outer circumferential portion of the steel terminal 165. Relative displacement between the rear bracket 105 and the thermostat 160 is restricted by fitting the holder 116 into a substantially cylindrical opening 105b, shown in FIGS. 2 and 3, disposed in the rear bracket 105 on an outer circumferential portion of the holder 116 to form a housing portion for housing the thermostat 160.

Figure 4:
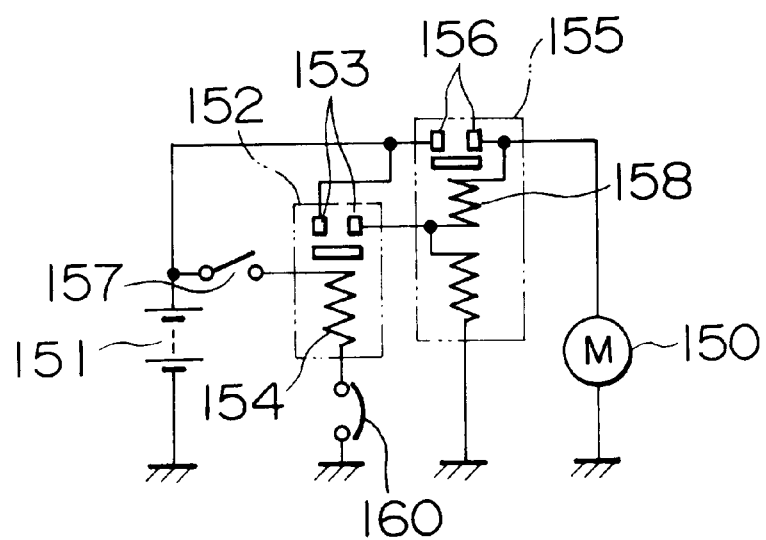
FIG. 4 is a schematic diagram of a starter circuit employing the starter according to Embodiment 1 of the present invention.

FIG. 4 shows an example of a schematic diagram of a starter circuit employing a starter incorporating the thermostat 160.

In the diagram, 151 is a battery power source, 157 is a start switch disposed in a key switch, 152 is an auxiliary switch comprising contacts 153 and a magnetizing coil 154, 155 is a magnetic switch, 156 are main contacts which switch on and off the main electric current to a starter motor 150 which is a direct-current motor for starting an engine, and 158 is an attracting coil which performs the dual functions of generating a resistance which supplies a minute current to the motor upon engagement of a pinion gear (not shown) of the starter and generating an attracting force which engages the pinion gear into the ring gear of an engine (not shown). The thermostat 160 which is provided with the fitted construction of this embodiment and is secured to the rear bracket 105 is connected in series to the magnetizing coil 154.

When the starter is not generating excessive heat, the contacts of the thermostat 160 are closed, so that when the start switch 157 is switched on, the magnetizing coil 154 is magnetized, closing the contacts 153 and switching on the auxiliary switch 152. At the same time, electric current flows to the attracting coil 158 of the magnetic switch 155, and as the current passes to the starter motor 150, the pinion gear is shifted and engages the ring gear. If the pinion gear engages the ring gear normally, the main contacts 156 close and the main current flows to the starter motor 150, starting the engine.

However, for reasons such as deterioration of the return of the key switch, etc., there are cases where the start switch 157 may not be switched off and the starter motor 150 may continue to rotate even after the engine has been ignited. In such cases, the temperature around the thermostat 160 will rise simultaneously due to heat generated by the motor portion. When the thermostat 160 rises above the predetermined temperature, the contacts of the thermostat 160 open, terminating the energizing of the magnetizing coil 154, whereby the auxiliary switch 152 is switched off, terminating the supply of current to the attracting coil 158 and the starter motor 150, so that the starter does not generate excessive heat.

Embodiment 2

Figure 5:
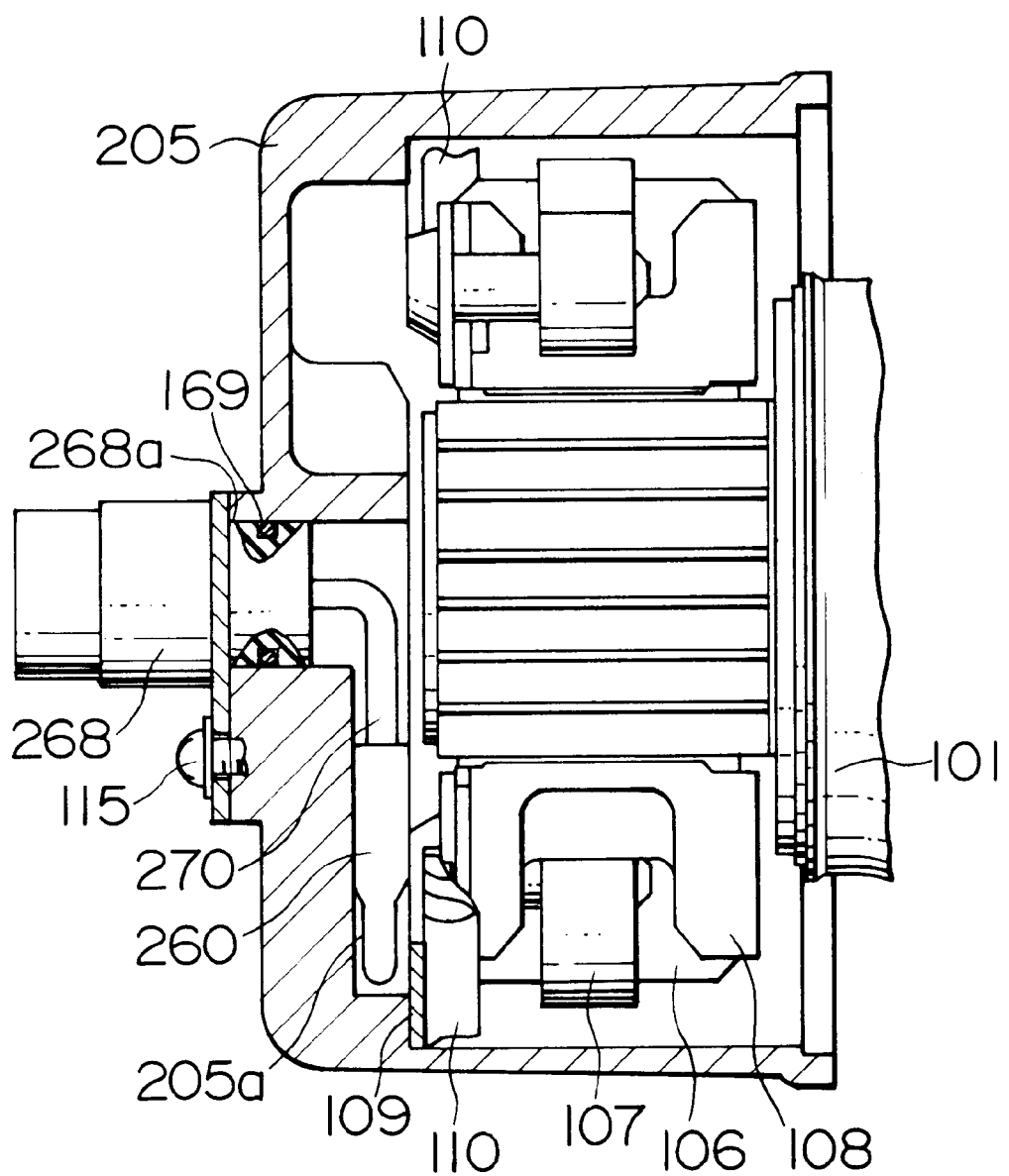
FIG. 5 is a cross-section of a fitted construction of a thermostat of a starter according to Embodiment 2 of the present invention.

FIG. 5 is a cross-section showing a fitted construction of a thermostat of a starter which is an embodiment of the present invention. The fitted construction of the thermostat in FIG. 5 differs from that in FIG. 1. Parts and portions the same as or similar to those in FIGS. 1 to 4 will be given the same numerals and duplicate explanations will be omitted.

Whereas in FIG. 1 the thermostat 160 and connector 168 are integrally formed, in FIG. 5 they are disposed independently.

A rod-shaped thermostat 260 having substantially the same construction and performing the same function as the thermostat 160 in FIG. 1 is disposed in a recess portion 205a disposed on the inside surface of an end portion of a rear bracket 205 which forms a housing portion for housing the thermostat 260, the longitudinal direction of the thermostat 260 being perpendicular to the axial direction of the armature 101 and the thermostat 260 being held between the rear bracket 205 and a brush holder base 109. That is to say, the thermostat 260 is disposed between the rear bracket 205 and brushes 106 secured to the brush holder base 109 by means of brush holders 108.

A molded resin connector 268 having substantially the same construction and performing the same function as the connector 168 in FIG. 1 is disposed in an end portion of the rear bracket 205, the connector 268 being secured to the rear bracket 205 by a screw 115. An O-ring 169 is disposed on the cylindrical outer circumferential portion 268a of the connector 268. The connector 268 and the thermostat 260 are bound by a harness 270 having two lead wires built therein to connect the connector 268 and the thermostat 260 which is covered with a resin material to insulate the two lead wires from each other electrically. The harness 270 is bent at a right angle midway so as to connect the connector 268 and the thermostat 260 while fitting into a gap within the rear bracket 205.

The starter according to the present invention comprises:
 brushes disposed in positions facing a commutator disposed around the circumference of an armature;
 a rear bracket for supporting the brushes; and
 a thermostat for detecting increases in the temperature of the starter and interrupting the energizing of the starter, the thermostat being disposed in the vicinity of the brushes and secured to the rear bracket, thereby facilitating detection of increases in temperature due to the generation of heat by the motor portion of the starter and enabling the thermostat to be secured reliably.

The starter according to the present invention may also comprise a holder for restricting relative displacement between the rear bracket and the thermostat, so that the thermostat is secured to the rear bracket reliably by the holder and is not held on one side only, thereby improving resistance to vibrations.

The starter according to the present invention may also comprise a connector electrically connected to the thermostat having an O-ring on the outer circumference thereof, thereby preventing water from infiltrating the inside of the starter and improving water resistance.

By the starter according to the present invention, the thermostat and the connector may be formed integrally, thereby reducing installation space and enabling the starter to be made more compact.

By the starter according to the present invention, the thermostat and the connector may be disposed independently, the thermostat and the connector being connected by lead wires, thereby enabling the connector and the thermostat to be mounted in different places to make use of dead space within the starter, thus enabling the starter to be made more compact.

By the starter according to the present invention, the thermostat may be rod-shaped, the longitudinal direction thereof may be parallel to the axial direction of the armature, and the thermostat may be disposed on the perimeter of the brushes, thereby facilitating detection of increases in temperature due to the generation of heat by the motor portion of the starter and also facilitating the machining of an opening disposed in the rear bracket for the insertion of the thermostat.

By the starter according to the present invention, the thermostat may be rod-shaped, the longitudinal direction thereof may be perpendicular to the axial direction of the armature, and the thermostat may be disposed between the brushes and the rear bracket, thereby facilitating detection of increases in temperature due to the generation of heat by the motor portion of the starter.

By the starter according to the present invention, a housing portion for housing the thermostat may be formed integrally with the rear bracket, thereby enabling the holder which restricts relative displacement between the rear bracket and the thermostat to be dispensed with in certain cases without increasing the size of the starter and also enabling the number of parts to be reduced.

What is claimed is:

1. A starter comprising:

brushes disposed in positions facing a commutator disposed around the circumference of an armature;

a rear bracket for supporting said brushes; and a thermostat for detecting increases in the temperature of said starter and interrupting the energizing of said starter, said thermostat being disposed in the vicinity of said brushes and secured to said rear bracket.

2. The starter according to claim 1, wherein said starter comprises a holder for restricting relative displacement between said rear bracket and said thermostat.

3. The starter according to claim 1, wherein said starter comprises a connector electrically connected to said thermostat having an O-ring on the outer circumference thereof.

4. The starter according to claim 3, wherein said thermostat and said connector are disposed independently, said thermostat and said connector being connected by lead wires.

5. The starter according to claim 4, wherein said thermostat is rod-shaped, the longitudinal direction thereof is perpendicular to the axial direction of said armature, and said thermostat is disposed between said brushes and said rear bracket.

6. The starter according to claim 5, wherein a housing portion for housing said thermostat is formed integrally with said rear bracket.

7. The starter according to claim 1, wherein said thermostat and said connector are formed integrally.

8. The starter according to claim 1, wherein said thermostat is rod-shaped, the longitudinal direction thereof is parallel to the axial direction of said armature, and said thermostat is disposed on the perimeter of said brushes.

9. The starter according to claim 1, wherein a housing portion for housing said thermostat is formed integrally with said rear bracket.

10. The starter according to claim 1, wherein said starter comprises a connector electrically connected to said thermostat having an O-ring on the outer circumference thereof.

11. The starter according to claim 1, wherein said thermostat and said connector are formed integrally.

12. The starter according to claim 11, wherein said thermostat is rod-shaped, the longitudinal direction thereof is parallel to the axial direction of said armature, and said thermostat is disposed on the perimeter of said brushes.

13. The starter according to claim 12, wherein a housing portion for housing said thermostat is formed integrally with said rear bracket.

14. The starter according to claim 1, wherein said thermostat and said connector are disposed independently, said thermostat and said connector being connected by lead wires.

15. The starter according to claim 14, wherein said thermostat is rod-shaped, the longitudinal direction thereof is perpendicular to the axial direction of said armature, and said thermostat is disposed between said brushes and said rear bracket.

16. The starter according to claim 15, wherein a housing portion for housing said thermostat is formed integrally with said rear bracket.

17. The starter according to claim 1, wherein said thermostat is rod-shaped, the longitudinal direction thereof is parallel to the axial direction of said armature, and said thermostat is disposed on the perimeter of said brushes.

18. The starter according to claim 1, wherein said thermostat is rod-shaped, the longitudinal direction thereof is perpendicular to the axial direction of said armature, and said thermostat is disposed between said brushes and said rear bracket.

19. The starter according to claim 18, wherein a housing portion for housing said thermostat is formed integrally with said rear bracket.

20. The starter according to claim 1, wherein a housing portion for housing said thermostat is formed integrally with said rear bracket.

* * * * *